Figure 8:
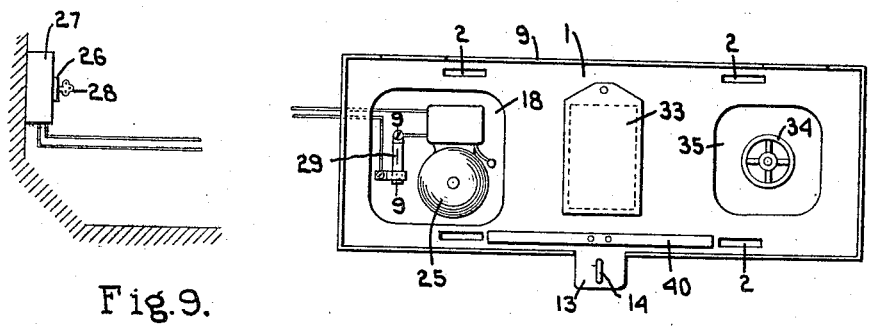

Nov. 4, 1924.
D. REISER ET AL
1,514,339
AUTOMOBILE THEFT INDICATOR
Filed May 21, 1921
2 Sheets-Sheet 1
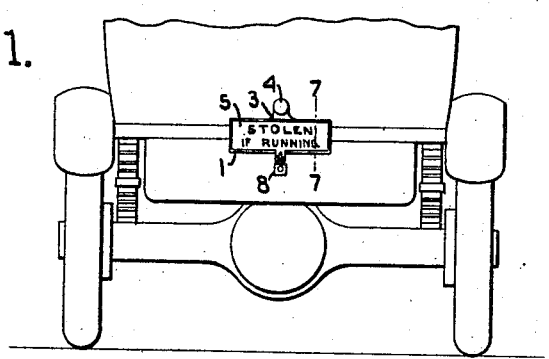
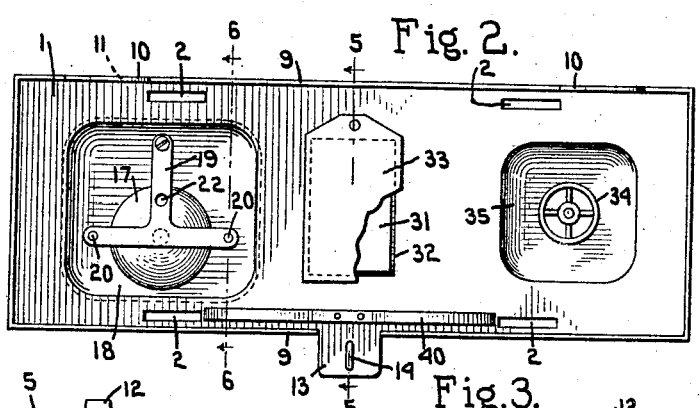
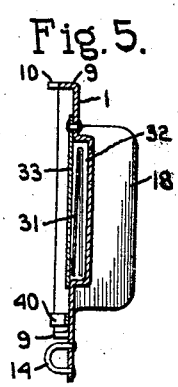
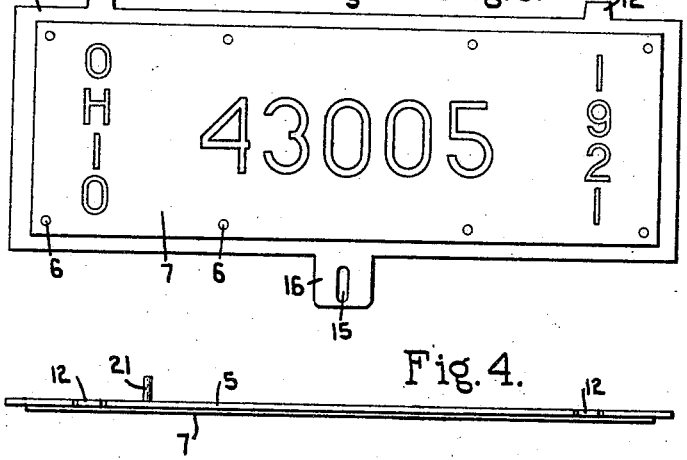
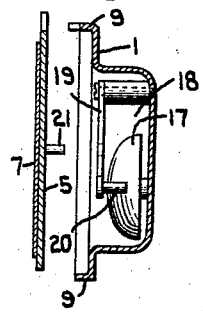
INVENTORS.
Orin J. Reiser
Daniel Reiser
BY Harold Elmo Smith
ATTORNEY.

Nov. 4, 1924.

D. REISER ET AL 1,514,339

AUTOMOBILE THEFT INDICATOR

Filed May 21, 1921    2 Sheets-Sheet 2

INVENTORS.
Orin J. Reiser
BY  Daniel Reiser

Harold Elmo Smith
ATTORNEY.

Patented Nov. 4, 1924.

1,514,339

UNITED STATES PATENT OFFICE.

DANIEL REISER AND ORIN J. REISER, OF CLEVELAND, OHIO.

AUTOMOBILE THEFT INDICATOR.

Application filed May 21, 1921. Serial No. 471,445.

*To all whom it may concern:*

Be it known that we, DANIEL REISER and ORIN J. REISER, citizens of the United States, residing at Cleveland, in the county of Cuyahoga and State of Ohio, have invented a certain new and useful Improvement in Automobile Theft Indicators, of which the following is a full, clear, and exact description, reference being had to the accompanying drawings.

This invention relates to theft indicating and ownership establishing devices for automobiles or the like, and has for its primary object the provision of a simply and inexpensively constructed device which will serve both as a holder for the ordinary State license tag and for means to indicate when the automobile is not being lawfully operated.

A further object of the invention is to provide a pocket in connection with my novel device, in which may be carried the owner's card and operator's license, or an identification card, which may be exhibited in case of question over the ownership of an automobile. This pocket is so constructed that it will be covered by the State license tag or the theft-indicating plate, and is accessible only to persons possessing the key or combination of the lock provided on the device to prevent the removal of said theft-indicating plate.

Another object of the invention resides in providing my improved theft indicating device with an alarm, such as a bell, which will be caused to sound should an attempt be made to operate the automobile during the time the theft indicator is set for protection. The invention also comprises novel means which prevents the bell from ringing when the State license tag is exposed, at which time our improved indicator is inoperative.

A further object of the invention consists in constructing the various parts of my improved device from sheet metal, stamped to present the desired shape and so formed that when locked together, one part overlies the edges of the other, thus making it impossible for a thief to insert sharp tools between the parts to silence the bell or pry open the device.

Another object of the invention comprises the provision of an electrically controlled alarm encased by the parts of my novel device, which will be actuated by operation of the ignition switch should an attempt be made to start the car when the theft signal was set, thus frightening away the thief if the attempt to move the car be unlawful, or reminding the owner to conceal the theft indicator if the attempt be lawful.

A still further object of the invention is to combine the indicating device with a gasoline control device; while further objects and advantages of the invention will become apparent as the description proceeds.

In the drawings wherein we have shown certain illustrative embodiments of our inventive idea.

Figure 9:
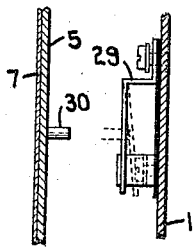
Figure 7:
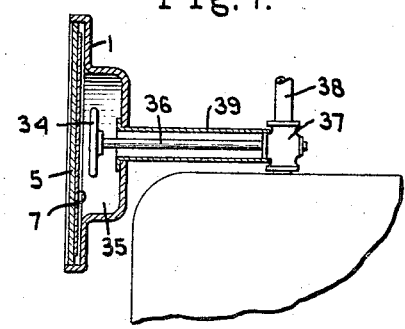
Figure 10:
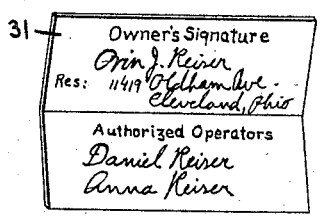

Fig. 1 is a rear elevation of an automobile having our invention applied thereto, Fig. 2 a front elevation of the license-tag and theft-indicating-plate support, Fig. 3 a front elevation of the license-tag and theft-indicating-plate, Fig. 4 a top plan view of the parts seen in Fig. 3, Fig. 5 a sectional view on the line 5—5 in Fig. 2, looking in the direction of the arrows, Fig. 6 a sectional view on the line 6—6 in Fig. 2, looking in the direction of the arrows, Fig. 7 a sectional view taken through the gasoline control lever of our novel device, as on the line 7—7 in Fig. 1, Fig. 8 a front elevation, similar to Fig. 2, of the license number and theft indicating support in combination with an electrically controlled alarm, there being shown diagrammatically a portion of an automobile and an ignition coil box, Fig. 9 a detail cross section, on an enlarged scale, taken on the line 9—9 in Fig. 8, Fig. 10 a perspective view of the identification member removed and open.

In the selected embodiment of the invention illustrated in the drawings, 1 denotes a metallic plate having suitable apertures 2 by which it may be secured to the front or rear end of an automobile, using the provisions ordinarily employed for the attachment of the official State license-tag. In Fig. 1, this plate is shown as attached to the rear-end license bracket 3 which is generally located beneath the tail lamp 4. Removably secured to the forward face of the plate 1 is a second plate 5, to one side of which is fixedly secured the usual State license tag 7, as by rivets 6. The attaching means whereby the plate 5 is secured to the plate 1 includes a locking device which can be operated by the owner or license operator but not by strangers. Preferably this consists of a padlock 8 which may be of the combination type as shown although a key padlock or any equivalent device may be used. A spring 40, attached to the plate 1, is used to keep the parts from rattling. We have illustrated in the drawings the plates 1 and 5 as being made of sheet metal blanks which are inexpensive and may be punched to the desired configuration. It is desirable to make the plate 1 slightly larger than plate 5 and to form lateral overhanging lips or flanges 9 on each edge of the plate 1 so that when the plate 5 is placed against plate 1 it will be encircled by the flanges 9. It will be apparent that this construction renders it impossible to insert a sharp tool between the plates to pry them apart. Laterally extending ears 10 are formed on one edge of the plate 1, said ears being provided with slots 11 in which are received projecting ears 12 formed on the plate 5. Also provided on the plate 1 is a depending lug 13 in which is mounted a hasp 14 which is adapted to enter a slot 15 provided in a corresponding depending lug 16 on the plate 5.

As described above the removable plate 5 carries on one side the State license tag. On the opposite side we provide an inscription such as "Stolen if running" or other legend calling attention to the unlicensed operation of the automobile, the purpose being that the owner or authorized operator reverses this plate 5 upon parking the machine and restores the plate upon returning to the machine.

This invention embodies means for actuating an audible alarm if the machine is being unlawfully operated by a stranger or negligently started by the owner. In Figs. 2 to 6 we have shown one form of such alarm, in which 17 designates a bell of any ordinary or suitable shape carried in a pocket or depression 18 formed in the plate 1. The bell is rung by the action of a clapper consisting of a T shaped member 19 pivoted at one side of the bell. The ends of the T shaped member carry pins 20 which extend inwardly and strike the bell when the member 19 is rocked about its pivot by the vibration or swaying of the machine. Means for preventing the clapper from actuating, when the State license tag is exposed, is shown as in a pin 21 projecting from the theft indicating side of plate 5, which is adapted to enter a hole 22 provided in the member 19 to hold said member rigid. The alarm mechanism is so covered by the plate 5 as to prevent tampering therewith.

Referring to Figs. 8 and 9, 25 denotes an electrically-operated bell which is carried in the pocket of the plate 1. The bell may be controlled from any place on the automobile and from any source of power; but in order to remind the owner to reverse his license plate and also to deter intending thieves we preferably attach the bell wires to the control switch 26 of the ignition coil 27, the operation being that when the key 28 is turned to close the ignition current it will also turn on the current connected with the alarm bell 25, when the theft indicator is set. Any suitable means for breaking the circuit of the bell line when the car has the State license-tag exposed may be utilized. 29 indicates a simple make and break connection which is actuated to break the circuit to the bell by a projecting pin 30 provided on the theft inscription side of the plate 5.

To provide a mode whereby the owner or authorized operator can establish his identity and authority in case he shall forget to restore the license plate to its proper position before starting his car, we provide one of the plates with a concealed identification member. Preferably this is in the form of a card or paper slip 31 carried in a pocket 32 formed in the plate 1 and held in place by a pivoted cover 33. Like the alarm mechanism this identification card and pocket are covered by the plate 5.

In Fig. 7 we have shown a further safeguard combined with the foregoing whereby the gasoline supply of an automobile may be controlled by a lever or wheel 34 which is carried in a pocket 35 formed in the plate 1. A suitable connection as a rod 36 from the lever 34 is used to operate a stop cock or other valve 37 in the feed line 38 of the gasoline system of an automobile. The lever 34 is accessible only when the plate 5 is detached, and in this manner an owner may protect his automobile from theft even though the alarm has been damaged and the theft inscription covered, as it is impossible for a car to be moved any great distance with the gasoline supply shut off. A tube 39 may be placed around the rod 36 to prevent manipulation thereof from outside the plate 1.

While we have described in detail certain physical embodiments of our invention we do not limit ourselves to such details nor to an employment at any one time of all the different elements herein set forth. It will be obvious that the theft indicating inscription plate may be used without the identification feature, or without the alarm or gasoline control, each feature in itself tending to add to the protective quality of our improvements but without restriction to the specific arrangement of parts and construction herein shown.

Having thus described our invention, we claim:

1. A theft indicator for automobiles comprising an open housing, means controlling the fuel supply of said automobile located within said housing, and a reversible plate carrying a theft indicating inscription on one side thereof and arranged to carry a license plate on the other side thereof and arranged to be secured to said housing to close said housing.

2. A theft indicator for automobiles comprising an open housing, means controlling the fuel supply of said automobile located within said housing, and a reversible plate carrying a theft indicating inscription on one side thereof and arranged to be secured to said housing to close said housing.

3. A theft indicator for automobiles comprising an open housing, means controlling the fuel supply of said automobile located within said housing, a plate independent of said housing and arranged to carry a license tag on one side thereof and to be secured to said housing to close said housing in either of two positions one with the license tag side exposed and the other with said license tag side concealed, an alarm, and means for preventing actuation of said alarm when said plate is in one of said positions.

4. A theft indicator for automobiles comprising an open housing, a plate independent of said housing and arranged to carry a license tag on one side thereof and to be secured to said housing to close said housing in either of two positions one with the license tag side exposed and the other with said license tag side concealed, an alarm, and means actuated by said plate for preventing actuation of said alarm when said plate is in one of said positions.

In testimony whereof, we hereunto affix our signatures.

ORIN J. REISER.
DANIEL REISER.